W. CARR.
Vehicle-Wheels.

No. 148,283. Patented March 10, 1874.

UNITED STATES PATENT OFFICE.

WILLIAM CARR, OF LOGANSPORT, INDIANA, ASSIGNOR OF ONE-HALF HIS RIGHT TO JAMES C. DEAN, OF CHICAGO, ILLINOIS.

IMPROVEMENT IN VEHICLE-WHEELS.

Specification forming part of Letters Patent No. 148,283, dated March 10, 1874; application filed March 3, 1873.

*To all whom it may concern:*

Be it known that I, WILLIAM CARR, of Logansport, Cass county, Indiana, have invented a new and useful Improvement in Wheels for Vehicles; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
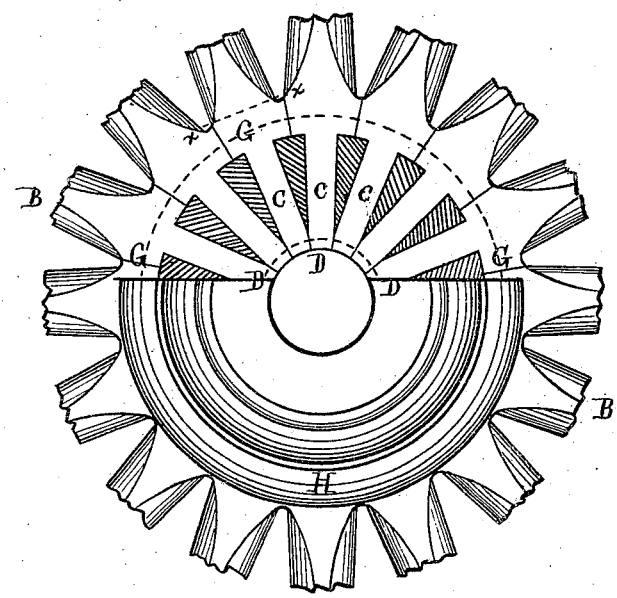
Figure 2:
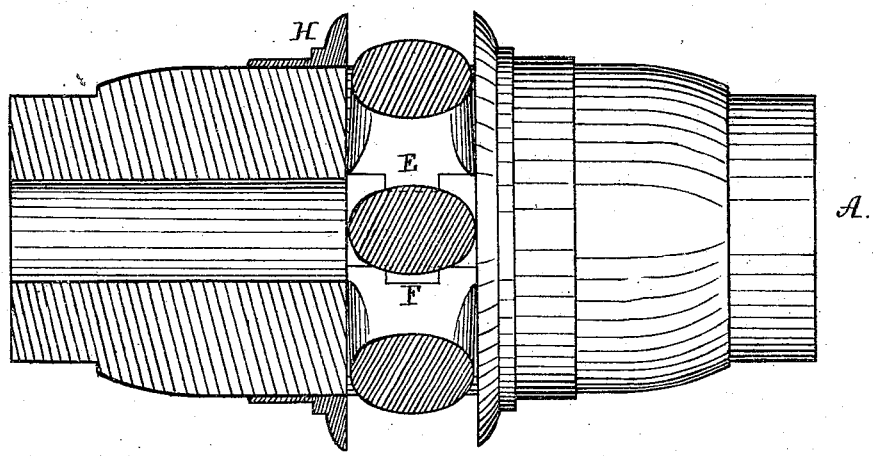
Figure 3:
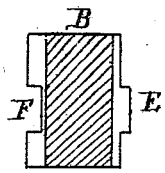

Figure 1 is a face view of the device embodying my invention. Fig. 2 is a top view, partly broken, in section. Fig. 3 is a section through one of the spokes in the line $x\ x$, Fig. 1.

Similar letters of reference indicate corresponding parts in the several figures.

This invention consists in the spokes constructed with tongues and grooves in the swells or enlargements of the spokes to form a locked arch outside of the hub, and with the tenons passing through the mortises in the hub-core, and uniting in the central opening of the core to form an inner arch.

Referring to the drawings, A represents the hub, B the spokes, and C the tenons of the spokes, which enter mortises or openings in the hub-core and pass therethrough so as to come in contact and form a continuous arch, D, of tenons, which, bearing and bracing against each other, form a solid and strong lining for the hub-core. The portion of each spoke just outside of the hub is enlarged and constructed on one side with a vertical tongue, E, and on the other side with a vertical groove, F, (see Fig. 3,) and the spokes are so arranged that when driven into the hub the tongue of one spoke will enter and engage with the groove of the adjacent spoke, the result being that the spokes throughout are locked to each other, and, by being contiguous, a continuous arch, G, is formed on the outside of the hub-core, whereby the spokes are braced against each other and firmly retained in position. A flanged or angular band, H, is fitted on the hub and brought against the arch G, and by means of nails, screws, or other fastenings passing through the band into the hub and arch, increases the firmness of the spoke and thoroughly prevents the working thereof.

I am aware that it is not new to employ tongues and grooves in the inner arch and the outer arch, and therefore do not claim them, but having described my invention what I do claim as new, and desire to secure by Letters Patent, is—

The combination of the mortised hub-core A, metallic band H, and spokes G, the spokes having the tenons C passing through the mortises in the hub-core and uniting at the central opening of the core to form the inner arch D, and having the tongues and grooves E F in the enlargement of the spokes, forming the locked arch G outside of the core, as set forth, and for the purpose described.

To the above I have signed my name this 6th day of January, 1873.

WILLIAM CARR.

Witnesses:
T. S. ROLLINS,
J. M. JUSTICE.